United States Patent
Spies et al.

(10) Patent No.: US 10,389,719 B2
(45) Date of Patent: Aug. 20, 2019

(54) PARAMETER BASED DATA ACCESS ON A SECURITY INFORMATION SHARING PLATFORM

(71) Applicant: HEWLETT PACKARD ENTERPRISE DEVELOPMENT LP, Houston, TX (US)

(72) Inventors: Terence Spies, Cupertino, CA (US); Tomas Sander, Princeton, NJ (US); Susan K. Langford, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 169 days.

(21) Appl. No.: 15/337,181

(22) Filed: Oct. 28, 2016

(65) Prior Publication Data
US 2018/0124054 A1    May 3, 2018

(51) Int. Cl.
*H04L 9/32* (2006.01)
*H04L 29/06* (2006.01)
(Continued)

(52) U.S. Cl.
CPC .......... *H04L 63/10* (2013.01); *H04L 9/0643* (2013.01); *H04L 63/0428* (2013.01);
(Continued)

(58) Field of Classification Search
CPC ... H04L 63/0428; H04L 63/083; H04L 63/10; H04L 9/0643
(Continued)

(56) References Cited

U.S. PATENT DOCUMENTS 6,957,330 B1 * 10/2005 Hughes ............... G06F 21/6218
                                                          713/162
7,113,594 B2    9/2006 Boneh et al.
(Continued)

FOREIGN PATENT DOCUMENTS

EP    1159651    5/2003
EP    1975847    10/2008

OTHER PUBLICATIONS

Sankareswari, S. et al., "Attribute Based Encryption with Privacy Preserving using Asymmetric Key in Cloud Computing," IJCSIT International Journal of Computer Science and Information Technologies, vol. 5.5, 2014, pp. 6792-6795.
(Continued)

*Primary Examiner* — Samson B Lemma (57) ABSTRACT

Example implementations relate to a security information sharing platform that enables sharing of security information among a plurality of members. For example, in an implementation, a system may determine that a first member of a community of a security information sharing platform is entitled access to a first set of encrypted information shared by a second member of the community. The system may also receive a request, from the first member, to access the first set of encrypted information, the request including a masked parameter. The system may also determine that the masked parameter matches an access parameter for accessing the first set of encrypted information and provide the first member access to the first set of encrypted information in response to determining that the masked parameter matches the access parameter.

17 Claims, 6 Drawing Sheets

(51) Int. Cl.
*H04L 9/06* (2006.01)
*H04L 29/08* (2006.01)

(52) U.S. Cl.
CPC .......... *H04L 63/065* (2013.01); *H04L 63/083* (2013.01); *H04L 63/102* (2013.01); *H04L 9/3236* (2013.01); *H04L 63/061* (2013.01); *H04L 63/068* (2013.01); *H04L 63/104* (2013.01); *H04L 67/1097* (2013.01)

(58) Field of Classification Search
USPC ....................................................... 713/170
See application file for complete search history.

(56) References Cited

U.S. PATENT DOCUMENTS

| | | | | |
|---|---|---|---|---|
| 8,756,673 | B2* | 6/2014 | Barrus | G06F 21/6254 713/159 |
| 2008/0244721 | A1* | 10/2008 | Barrus | G06F 21/6254 726/9 |
| 2010/0185861 | A1 | 7/2010 | Chase et al. | |
| 2013/0061035 | A1* | 3/2013 | Hook | H04L 9/088 713/150 |
| 2014/0226816 | A1 | 8/2014 | Dolev et al. | |
| 2015/0039888 | A1* | 2/2015 | Barrus | G06F 21/6254 713/168 |
| 2015/0278553 | A1 | 10/2015 | Matsuda et al. | |

OTHER PUBLICATIONS

Sandhu, R. et al., "RT-Based Administrative Models for Community Cyber Security Information Sharing," (Research Paper), Collaborative Computing: Networking, Applications and Worksharing (CollaborateCom), 2011 7th International Conference on, IEEE, 6 pages, available at https://www.researchgate.net/profile/Khalid_Bijon/publication/221391844_RT-based_administrative_models_for_community_cyber_security_information_sharing/links/5612e93a08aedee13b5c000a.pdf.

European Patent Office, Extended European Search Report for Appl. No. 17191879.0-1218 dated Mar. 8, 2018 (8 pages).

* cited by examiner

PARAMETER BASED DATA ACCESS ON A SECURITY INFORMATION SHARING PLATFORM

BACKGROUND

Members of a security information sharing platform share security indicators, security alerts, and/or other security-related information (e.g., mitigations strategies, attackers, attack campaigns and trends, threat intelligence information, etc.) with other members in an effort to advise the other members of any security threats, or to gain information related to security threats from other members.

BRIEF DESCRIPTION OF THE DRAWINGS

The following detailed description references the drawings, wherein.

DETAILED DESCRIPTION

Members of a security information sharing platform share information such as security indicators, security alerts, and/or other information (e.g., mitigations strategies, attackers, attack campaigns and trends, threat intelligence information, etc.) with other members in an effort to advise the other members of any security threats, or to gain information related to security threats from other members. The other members with whom the security information is shared typically belong to a community that is selected by the member for sharing, or to the same community as the member. The other members of such communities may further share the security information with further members and/or communities. A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus.

A "member," as used herein, may include an individual, organization, or any entity that may send, receive, and/or share the security information. A community may include a plurality of members. For example, a community may include a plurality of individuals in a particular area of interest. A community may include a global community where any member may join, for example, via subscription. A community may also be a vertical-based community. For example, a vertical-based community may be a healthcare or a financial community.

In some instances, a community may also be a private community with a limited number of selected members. A private community may be defined by explicitly enumerating its members by, for example, selecting a particular set of members of the security information sharing platform. However, it is not an easy task to facilitate and manage a private community with a limited number of selected members. It may be technically challenging, for example, to determine how to share security information among members of a private community without sharing that security information with the other members of the security information sharing platform. Further, that technical challenge may be exacerbated in situations where a member sharing information wishes to control access to data shared by that member.

Since communities are dynamic and the information shared may be extremely sensitive, it may be desirable to have controls around data access that are cryptographically enforced. As an example, it may be important that messages are shared with certain entities or individuals based on applied security policies. For this data access control to be effective, it should be enforced by cryptographic controls rather than through server based access controls, which can be changed or subverted by an administrator. It may be technically challenging, however, to effectively control data access of shared information for dynamic communities through cryptographic controls.

Enumerating community members may lead to communities where members already know each other (or administrators know them). This introduces structural inefficiencies for sharing information as information may not always reach the parties who would benefit from it, but only those that are personally known. Enumerating community members by name may also introduce privacy challenges as at least sometimes members may wish to keep this information hidden, e.g. if membership in a community allows to conclude that they've been breached by a particular attack.

Also, sometimes sharing will have some ad-hoc components for which it would simply be confusing to design an explicit, new community. There would simply be too many communities to manage. This is illustrated by the following example. Imagine a government wishes to share classified information about an emerging attack with the largest US banks, but only with those individuals in those banks who also have a security clearance. A community of the 'Top 10 US Banks' may exist. However it would be confusing for this one-time exchange to explicitly create an entirely new community that consists of all the members of top 10 US Banks and that have a security clearance. This example also points to a semantic gap. Just looking at the list of members may not identify specific characteristics this community has (e.g. that all its members have a security clearance).

In addition, the data may be encrypted to protect the data from compromise. Ideally these encryption techniques should encrypt data so that members of the communities that are authorized to access certain encrypted data will be able to decrypt the encrypted data. Examples discussed herein may addresses these technical challenges by creating communities based on parameters characterizing its members rather than explicitly listing the members.

The parameters defining a group may also be sensitive for a given data item, so a mechanism that protects those parameters may also be useful. Attackers should, for certain data items, not be able to ascertain the parameters of the recipients that are capable of decrypting the message.

An example system for parameter based data access on a security information sharing platform that enables sharing of security information among a plurality of members is may comprise availability handler to make a first set of encrypted information available to a first member of a community of the security information sharing platform, wherein the first set of encrypted information is shared by a second member of the community. The system may also comprise a request receiver to receive a request, from the first member, to access the first set of encrypted information, the request including a masked parameter. The system may also comprise a parameter determiner to determine that the masked parameter matches an access parameter for accessing the first set of encrypted information and an access provider to provide the first member access to the first set of encrypted information in response to determining that the masked parameter matches the access parameter.

Figure 1A:
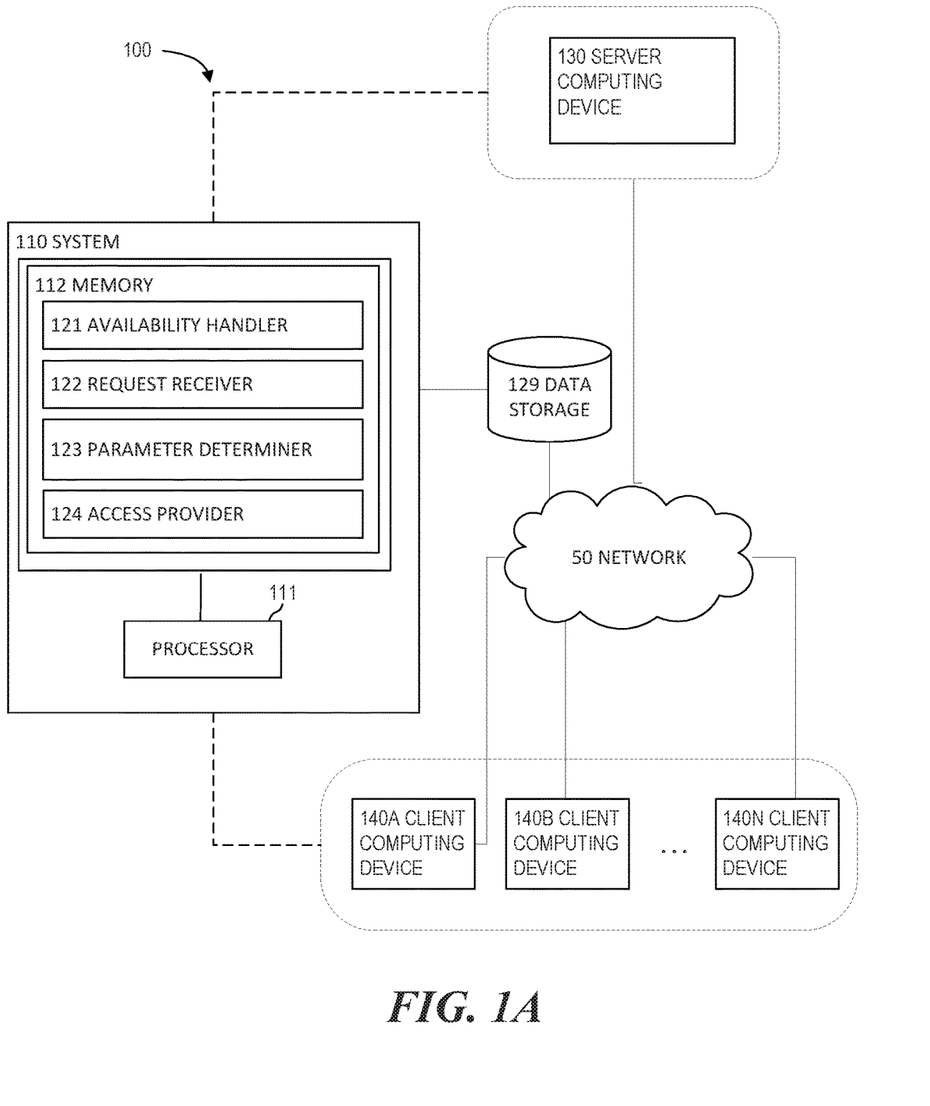
FIG. 1A is a block diagram depicting an example environment in which various examples may be implemented as a security information sharing platform with parameter based data access.

FIG. 1A is an example environment 100 in which various examples may be implemented as a system 110 for parameter based data access on a security information sharing platform. A security information sharing platform enables sharing of security information among a plurality of members. Environment 100 may include various components including server computing device 130 and client computing devices 140 (illustrated as 140A, 140B, . . . , 140N). Each client computing device 140A, 140B, . . . , 140N may be used by members of the community to communicate requests to and/or receive responses from server computing device 130. Server computing device 130 may receive and/or respond to requests from client computing devices 140. Client computing devices 140 may be any type of computing device providing a user interface through which a member can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing member interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1A may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, system 110 and the various components described herein may be implemented in hardware and/or a combination of hardware and programming that configures hardware. Furthermore, in FIG. 1A and other Figures described herein, different numbers of components or entities than depicted may be used.

System 110 may include a processor 111 and a memory 112 that may be coupled to each other through a communication link (e.g., a bus). Processor 111 may include a Central Processing Unit (CPU) or another suitable hardware processor. In some examples, memory 112 stores machine readable instructions executed by processor 111. Memory 112 may include any combination of volatile and/or non-volatile memory, such as combinations of Random Access Memory (RAM), Read-Only Memory (ROM), flash memory, and/or other suitable memory. Memory 112 may store instructions to be executed by processor 111 including instructions for access determiner 121, request receiver 122, parameter determiner 123 and access provider 124.

Processor 111 may execute instructions of access determiner 121 make a first set of encrypted information available to a first member of a community of a security information sharing platform. The security information sharing platform may enable sharing of security information among a plurality of members. The first set of encrypted information shared by a second member of the community. In some examples, a set of policies may be stored in data storage 129. The set of policies may be used to determine access for security information, such as the first set of encrypted information. In some examples, an individual policy to be used may be received from the second member along with the first set of encrypted information and may be stored in data storage 129. In some examples, the set of policies may be standard for the community. In some examples, the set of policies may be customized. For example, the policy may be customized by the second member that provides the shared information. In other examples, the set of policies may be customized by the community or based on preferences of the community.

The set of policies may also indicate the type of encryption used to encrypt shared information, such as the first set of encrypted information. In some examples, the community may comprise a set of key management capabilities that are allowed for use to encrypt information communicated via the community. For example, the community may customize the set of key management capabilities that the community allows for use as an encryption mechanism. The customized set of key management capabilities may comprise all of or a subset of the standard key management capabilities, may comprise a different set of key management capabilities than the standard key management capabilities, and/or may otherwise comprise key management capabilities used as encryption mechanisms.

The set of policies may indicate that information is shared with other members of the community (such as members using client computing device 140B . . . 140N) based on certain parameters. In other words, members having the correct parameters can access the information. Members that do not have the correct parameters, or a portion (but not all of) the correct parameters may not be able to access the information. Various parameters associated with a member of the security information sharing platform may be managed by server computer device 130 and/or stored, in a database (e.g., data storage 129).

The set of parameters may include, for example, member parameters, content parameters, situational parameters, and/or other types of parameters related to the request to share the first set of information. Member parameters may comprise, for example, a property of the first member that requested to share the data, a property of one or more recipients of the request, a shared property of the recipient(s)

of the request, a property of the community (e.g., an attribute of the community), and/or other properties that relate to a member that could be associated with the first request. A property may comprise an attribute or any other characteristic, information or property with which the member attribute is associated.

The parameter may be a group and/or characteristic of a group within the community of the security information sharing platform that the first member belongs to. In some implementations, a certain collection of member attributes may form a set of community attributes to be used to generate a particular community. "A set of community attributes," as used herein, may refer to a particular collection and/or assembly of member attributes that describe members to be included in a particular community. For example, a set of community attributes may be in form of a monotonic expression. It may be expressed as: "Top 10 US Bank" AND "Security Clearance." Any members associated with a first member attribute (e.g., "TOP 10 US Bank") and a second member attribute (e.g., "Security Clearance") would satisfy this set of community attributes. Another example set of community attributes may comprise: ("Top 10 US Bank" AND "Security Clearance") OR "China". Note that a member that is not associated with the member attribute "China" may still satisfy this set of community attributes as long as the member is associated with "Top 10 US Bank" and "Security Clearance." In some situations, a set of community attributes may be expressed in such a way that it includes a negation such as: ("Top 10 US Bank" AND "Security Clearance") NOT "Russia". In this case, a member that is associated with "Russia" may not satisfy the set of community attributes as defined.

In some implementations, the set of community attributes may be used as a name and/or label for the community being generated based on that set of community attributes. In this way, by simply looking at the name and/or label, the type of the community can be easily identified.

A member (e.g. a case initiator) may create a community in an implicit way by defining a set of community attributes characterizing its members rather than explicitly enumerating each individual member to be included. In this way, if a large number of members with a common set of characteristics were to be added to the community, it may be more effective to create a community based on a set of community attributes.

Content parameters may comprise, for example, a property about the content of the request, an information type of the request, relevance of the first set of information, an indicator of whether the content comprises an observable, an indicator of whether the content comprises a security indicator, and/or another property that relates to content of the request.

Situational parameters may comprise, for example, an alert level in the security information sharing platform, a sensitivity level associated with the first set of information, a sensitivity level associated with the community, a reputation of the first member, a reputation of an intended recipient of the first set of information, a combined reputation of intended recipient(s) of the first set of information, and/or other information related to the situation and/or environment in which the request is received.

The parameters themselves, however, may also be sensitive for a given data item, so a mechanism that protects the parameters may also be used. In this manner, attackers may not be able to ascertain the parameters of the members that are capable of accessing the data. A member sharing data may be able to obscure the recipients and/or the relevant parameters belonging to the recipients.

Processor 110 may execute instructions of request receiver 114 to receive a request, from the first member, to access the first set of encrypted information, the request including a masked parameter. The request may be received, by server computing device 130.

The parameter may be "masked" in a number of ways. Various implementations of parameter masking will now be described in turn. For example, in some implementation the parameter may be encrypted with a parameter masking key managed by parameter masking key server, such as the server computing device 130. Accordingly, the masked parameter may be the parameter, for accessing the first set of information, encrypted using a parameter masking key. A member of the community (represented by, for example, the client computer device 140A) that believes that they have access to the first set of information can request access to the first set of information from the server computing device 130 that manages access to the parameter masking key. Specifically, the member may transmit an access request to the server computing device 130 including the encrypted attribute and/or an identifier of the parameter masking key that the member desires access to. Server computing device 130 may determine if the first member has the parameter that is encrypted in the masked parameter. If the server computing device 130 determines that the first member does have the parameter for accessing the first set of information, than the server computing device 130 may provide the first member access to the first set of information.

In another implementation, the parameters for accessing the data may be "masked" through the use of a data password. The masked parameter may be a data password constructed using a message authentication code and a first parameter for accessing the first set of encrypted data. The password may be formed by a message authentication code of the member name and/or member attribute combined with the parameter(s) used for accessing the information. A member may construct the data password by computing a message authentication code (MAC) over the plaintext parameter and encoding some subset of that MAC as the data password. A MAC may be a piece of information used to verify the identity of a member.

Processor 110 may execute instructions of parameter determiner 123 to determine that the masked parameter matches an access parameter for accessing the first set of encrypted information. Parameter determiner 123 may verify that the member is associated with the proper attribute. For example, parameter determiner 123 may determine that the first member is associated with the parameter to access the first set of encrypted information. Parameter determiner 123 may access a parameter database, such as data storage 129 to determine a set of parameters associated with the first member. Parameter determiner 123 may verify that the member is associated with the proper attribute by, for example, accessing a profile of the member from a data store, such as data storage 129. In some aspects, the request sent by the member may include attributes that are associated with the member. The server may decrypt the encrypted attribute and compare the decrypted attribute to the attributes sent by the member.

In aspects using the parameter masking key, the parameter determiner 123 may decrypt the masked parameter using the parameter masking key and determine that the first parameter is the access parameter for accessing the first set of encrypted information.

In aspects using the data password, the parameter determiner 123 may recompute the first parameter from the data password and determine that the first parameter is the access parameter for accessing the first set of encrypted information.

Processor 110 may execute instructions of access provider 124 to provide the first member access to the first set of encrypted information in response to determining that the masked parameter matches the access parameter. In some aspects, the member may be provided access to the encrypted information directly. For example, the server managing access, such as the server computing device 130 may transmit the first set of encrypted information to the first member.

In some aspects, the member may be provided with a key and/or a data key component for accessing the information instead of or in addition to the first set of encrypted information. Providing the first member access to the first set of encrypted information may thus include transmitting, to the first member, a data key component used to access the first set of encrypted information. For example, if the server computing device 130 determines that the member is associated with the proper attribute(s), the server may send a data key component to the member. The data key component may be an actual decryption key for decrypting the first set of encrypted information and may be used to decrypt the first set of encrypted information.

In some aspects, the data key component may be a portion of the actual key used for decrypting the first set of encrypted information. Accordingly, a first data key component may be combined with a second data key component to form a data key that can be used to decrypt the first set of encrypted information. In these aspects, different data key components used to construct the actual decryption key may be managed by different servers.

For example, a first set of encrypted information may be accessible by members having the parameters "US Security clearance" and "TOP 10 US banks". Accordingly, the member may request access to the first set of encrypted information from both a first server, corresponding to "US Security clearance" parameter, and a second server, corresponding to the "TOP 10 US banks" parameter. Accordingly, the member may in turn receive a first data key component corresponding to the "US Security clearance" parameter from the first server (if, of course, the member has the proper parameter) and may get a second data key component corresponding to the "TOP 10 US banks" from the second server (if, of course, the member has the proper parameter). Importantly, the different servers may be owned and/or managed by different parties and/or according to different policies. For example, the first server may be managed by and/or according to polices of a government agency and the second server may be managed by and/or according to polices of a software proprietor. In this manner, different servers, that may be owned and/or managed by separate parties, may be used to manage different data key components associated with different attributes.

In some aspects, a data key component may be a time-based data key component. A time-based key may last for a certain period of time and may expire after that certain period of time and/or on a certain date.

In aspects using the data password, if the data password is correct, the member may gain access to the information that is encrypted. In some aspects, the data password may be used as the key to decrypt the encrypted information and thus gain access to the encrypted information. In some aspects, the data password may be verified by a password management server. The password may be verified by the password management server by recomputing the MAC and the parameter used in constructing the password. The parameter may then be matched to the attributed used for accessing the encrypted information. After successful verification, the member may be given access to the data via a decryption key, the first set of information directly, or via some other means.

Figure 1B:
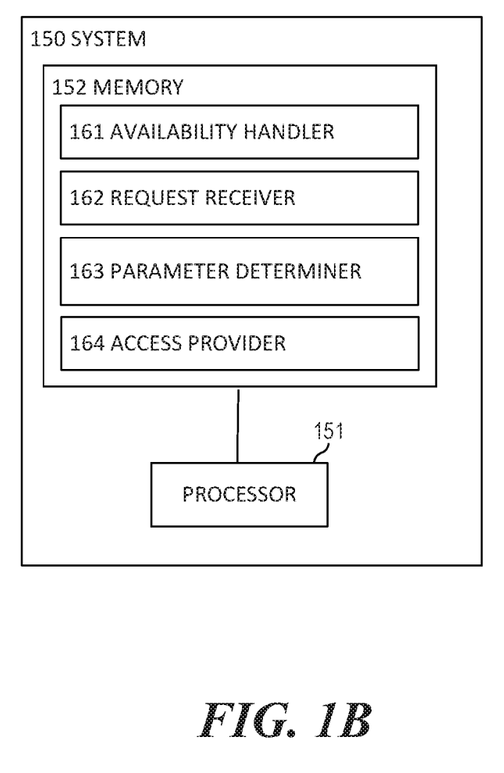
FIG. 1B is a block diagram depicting an example system for parameter based data access on a security information sharing platform.

FIG. 1B is a block diagram depicting an example system 150 for parameter based data access on a security information sharing platform. System 150 may include a processor 151 and a memory 152 that may be coupled to each other through a communication link (e.g., a bus). Processor 151 may include a Central Processing Unit (CPU) or another suitable hardware processor. In some examples, memory 152 stores machine readable instructions executed by processor 151. Memory 152 may include any suitable combination of volatile and/or non-volatile memory, such as combinations of Random Access Memory (RAM), Read-Only Memory (ROM), flash memory, and/or other suitable memory. Memory 152 may also include a random access non-volatile memory that can retain content when the power is off.

Memory 152 may store instructions to be executed by processor 151 including instructions for implementing instructions for access determiner 161, request receiver 162, parameter determiner 163 and access provider 164. Access determiner 161, request receiver 162, parameter determiner 163 and access provider 164 represent access determiner 121, request receiver 122, parameter determiner 123 and access provider 124 (e.g. as described above in reference to system 110), respectively.

Figure 2:
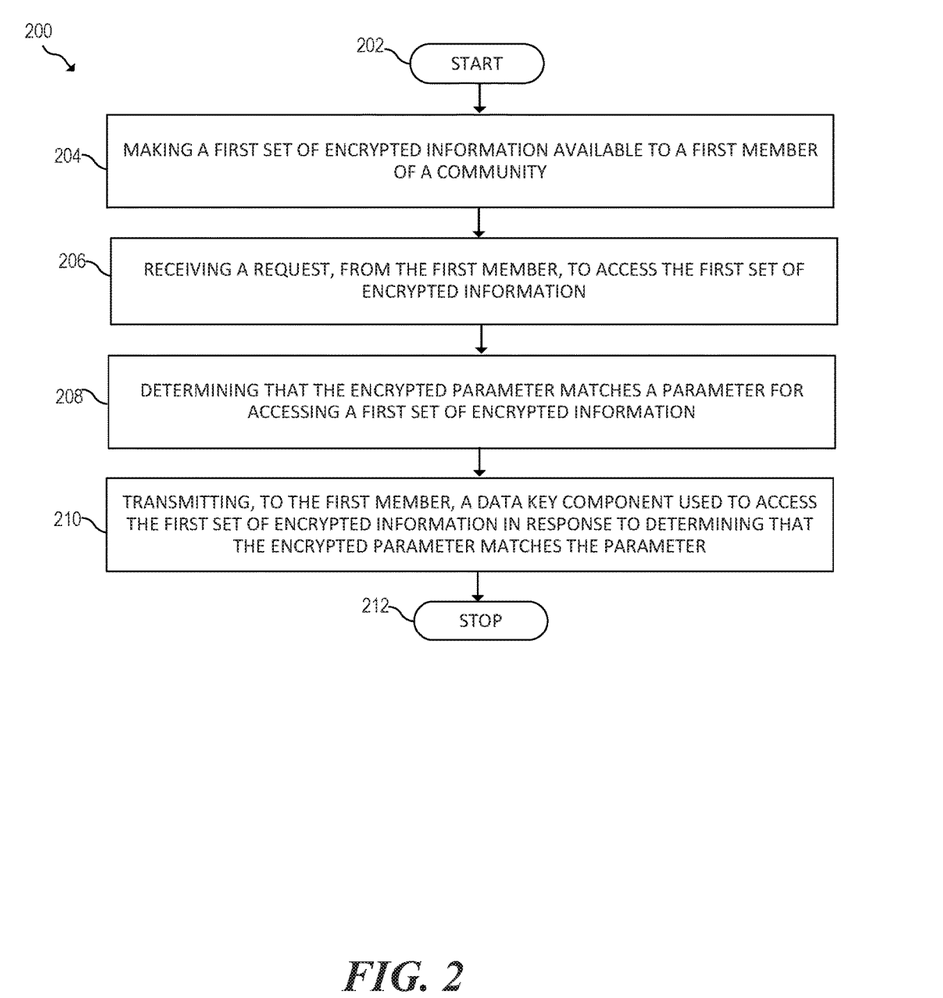
FIG. 2 is a flow diagram depicting an example method for parameter based data access on a security information sharing platform using a parameter masking key.

FIG. 2 is a flowchart of an example method 200 for parameter based data access on a security information sharing platform using a parameter masking key. Method 200 may be described below as being executed or performed by a system, for example, system 110 of FIG. 1A, system 150 of FIG. 1B or system 500 of FIG. 5 to be described below. Other suitable systems and/or computing devices may be used as well. Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 200 may be implemented in the form of electronic circuitry (e.g., hardware). At least one block of method 200 may be executed substantially concurrently with other blocks or in a different order than shown in FIG. 2. Method 200 may include more or less blocks than are shown in FIG. 2. Some of the blocks of method 200 may, at certain times, be ongoing and/or may repeat.

Method 200 may start at block 202 and continue to block 204, where the method may include making a first set of encrypted information available to a first member of a community. The security information sharing platform may enable sharing of security information among a plurality of members. The first set of encrypted information shared by a second member of the community. At block 206 the method may include receiving a request, from the first member, to access the first set of encrypted information, the request including an encrypted parameter and an identifier for a parameter masking key corresponding to the encrypted parameter. The parameter masking key may have been used to encrypt the encrypted parameter. At block 208 the method may include determining that the encrypted parameter matches a parameter for accessing a first set of encrypted information.

Determining that the encrypted parameter matches a parameter for accessing the first set of encrypted information may include decrypting, at a parameter masking key management server, the encrypted parameter. This decrypted parameter may identify the parameter that a member should have in order to access the first set of information.

The parameter masking management server may also determine which parameters are associated with the first member. Information about which parameters are associated with the first member may be included in the request and/or may be retrieved from a data store that stores information, such as associated attributes, of the members of the community. The parameter masking management server may compare the decrypted parameter that a member should have in order to access the first set of information to the parameters that the first member does have. If the decrypted parameter matches a parameter belonging to the first member, it may be determined that the encrypted parameter matches a parameter for accessing a first set of encrypted information. This matching indicates that the first member does indeed have access to the first set of encrypted information.

Accordingly, at block 210 the method may include transmitting, to the first member, a data key component used to access the first set of encrypted information in response to determining that the encrypted parameter matches the parameter. In some aspects, the data key component may be combined with a second data key to form a third data key that can be used to decrypt the first set of encrypted information. In some aspects the data key component may be managed by a first server corresponding to a first party and the second data key component is managed by a second server corresponding to a second party. The method may proceed to block 212 where the method may end.

Figure 3A:
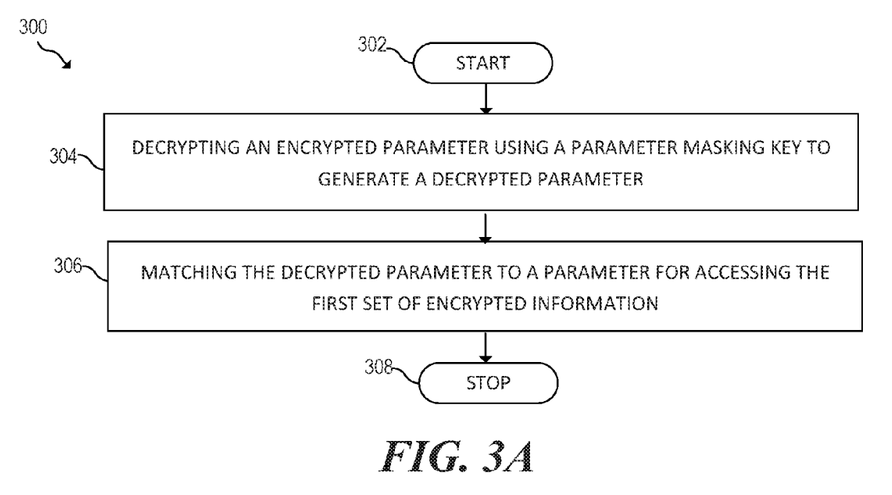
FIG. 3A is a flow diagram depicting an example method for matching parameters.

FIG. 3A is a flowchart of an example method 300 for matching parameters. Specifically, method 300 describes additional blocks that may be performed as part of determining that the encrypted parameter matches a parameter for accessing a first set of encrypted information (e.g., as described above in reference to block 208 of method 200 for parameter based data access on a security information sharing platform using a parameter masking key). Method 300 may be described below as being executed or performed by a system, for example, system 110 of FIG. 1A, system 150 of FIG. 1B or system 500 of FIG. 5 described below. Other suitable systems and/or computing devices may be used as well. Method 300 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 300 may be implemented in the form of electronic circuitry (e.g., hardware). At least one block of method 300 may be executed substantially concurrently with other blocks or in a different order than shown in FIG. 3A. Method 300 may include more or less blocks than are shown in FIG. 3A. Some of the blocks of method 300 may, at certain times, be ongoing and/or may repeat.

Method 300 may start at block 302 and continue to block 304, where the method may include decrypting an encrypted parameter (such as the encrypted parameter discussed above in reference to blocks 206 and 208 of method 200) using a parameter masking key (such as the parameter masking key discussed above in reference to block 206) to generate a decrypted parameter. At block 306, the method may include matching the decrypted parameter to a parameter for accessing the first set of encrypted information (such as the parameter for accessing a first set of encrypted information discussed above in reference to block 208 of method 200). If the decrypted parameter does match the parameter for accessing the first set of encrypted information, it may be determined that the encrypted parameter matches a parameter for accessing a first set of encrypted information (e.g., as described above in reference to block 208 of method 200 for parameter based data access on a security information sharing platform using a parameter masking key). The method may continue to block 308 where the method may end.

Figure 3B:
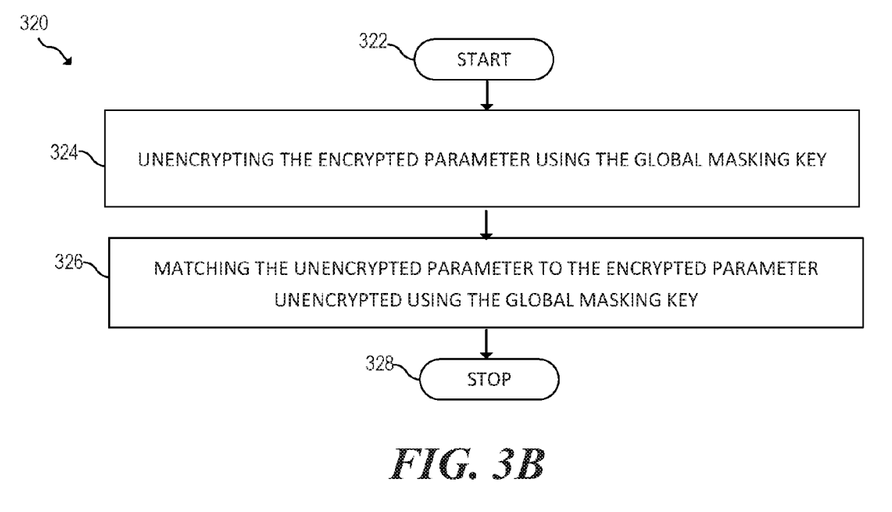
FIG. 3B is a flow diagram depicting another example method for matching parameters.

FIG. 3B is a flowchart of an example method 320 for matching parameters. Specifically, method 320 describes additional blocks that may be performed as part of determining that the encrypted parameter matches a parameter for accessing a first set of encrypted information (e.g., as described above in reference to block 208 of method 200 for parameter based data access on a security information sharing platform using a parameter masking key). Method 320 may be described below as being executed or performed by a system, for example, system 110 of FIG. FIG. 1A, system 150 of FIG. 1B or system 500 of FIG. 5 described below. Other suitable systems and/or computing devices may be used as well. Method 320 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 320 may be implemented in the form of electronic circuitry (e.g., hardware). At least one block of method 320 may be executed substantially concurrently with other blocks or in a different order than shown in FIG. 3B. Method 320 may include more or less blocks than are shown in FIG. 3B. Some of the blocks of method 330 may, at certain times, be ongoing and/or may repeat.

Method 300 may start at block 302 and continue to block 304, where the method may include decrypting an encrypted parameter using a parameter masking key to generate a decrypted parameter. The method 300 continues to block 306 and further includes matching the decrypted parameter to a parameter for accessing the first set of encrypted information. The method stops at block 308. Moreover, in some embodiments, a request, sent by a first member a community of a security information sharing platform that enables sharing of security information among a plurality of members, to access the first set of encrypted information (such as the request to access the first set of encrypted information discussed above in reference to block 206 of method 200) may include an unencrypted parameter. The unencrypted parameter may correspond to a parameter belonging to a first member of the community. This parameter may be the parameter for accessing the first set of encrypted information. Accordingly, the first member may send this parameter as a credential to verify that the first member has the parameter for accessing the first set of encrypted information. The first member may transmit the unencrypted parameter securely through a private message to prevent the unencrypted parameter from being discovered by other parties, such as other members of the community, malicious actors, etc.

In FIG. 3B, a method may start at block 322 and at block 324 the method may include unencrypting the encrypted parameter using the global masking key and at block 326, the method may include matching the unencrypted parameter to the encrypted parameter unencrypted using the global masking key. The encrypted parameter may be decrypted using the global masking key. The unencrypted parameter may be compared to the parameter for accessing a first set of encrypted information to determine if the first member does indeed have access to the first set of encrypted information. If the unencrypted parameter does match the decrypted parameter, it may be determined that the encrypted parameter matches a parameter for accessing a first set of encrypted information (e.g., as described above in reference to block 208 of method 200 for parameter based data access on a security information sharing platform using a parameter masking key). The method may proceed to block 328 where the method may end. The method may proceed to block 328 where the method may end.

Figure 4:
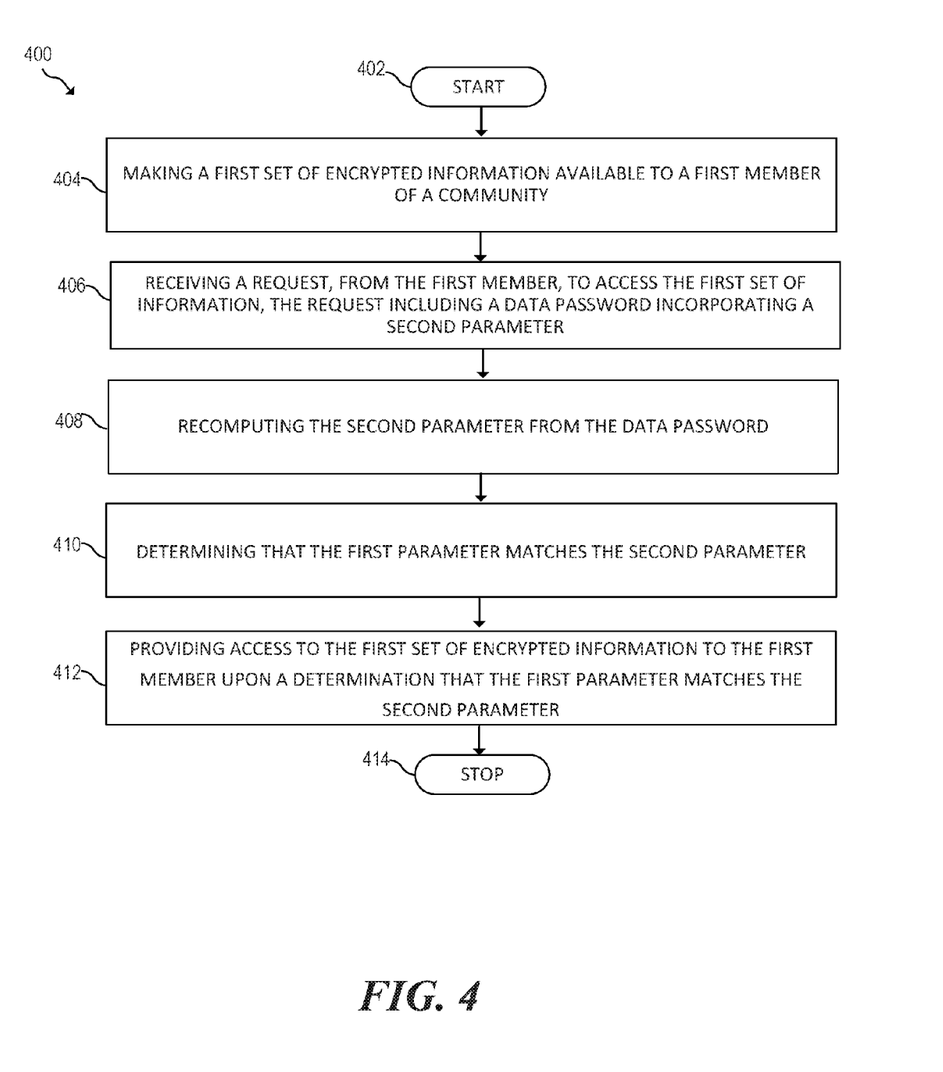
FIG. 4 is a block diagram depicting an example method for parameter based data access on a security information sharing platform using a data password.

FIG. 4 is a flowchart of an example method 400 for parameter based data access on a security information sharing platform using a data password. Method 400 may be described below as being executed or performed by a system, for example, system 110 of FIG. 1A, system 150 of FIG. 1B or system 500 of FIG. 5 described below. Other suitable systems and/or computing devices may be used as well. Method 400 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 400 may be implemented in the form of electronic circuitry (e.g., hardware). At least one block of method 400 may be executed substantially concurrently with other blocks or in a different order than shown in FIG. 4. Method 400 may include more or less blocks than are shown in FIG. 4. Some of the blocks of method 400 may, at certain times, be ongoing and/or may repeat.

Method 400 may start at block 402 and continue to block 404, where the method may include making a first set of encrypted information available to a first member of a community. The security information sharing platform may enable sharing of security information among a plurality of members. The first set of encrypted information may be shared by a second member of the community and may be accessible by members of the community having a first parameter. The first parameter, governing access to the first set of information, may be stored, for example, on data storage (such as the data storage 129 described above in reference to FIG. 1A). At block 406 the method may include receiving a request, from the first member, to access the first set of information, the request including a data password incorporating a second parameter. The second parameter is the parameter that is associated with the first member. The data password may be constructed using a message authentication code and the second parameter. At block 408 the method may include recomputing the second parameter from the data password. At block 410 the method may include determining that the first parameter (governing access to the first set of information) matches the second parameter (associated with the first member). A match indicates that the first member does indeed have access to the first set of information. At block 412 the method may include providing access to the first set of encrypted information to the first member upon a determination that the first parameter matches the second parameter. The method may proceed to block 414, where the method may end.

Figure 5:
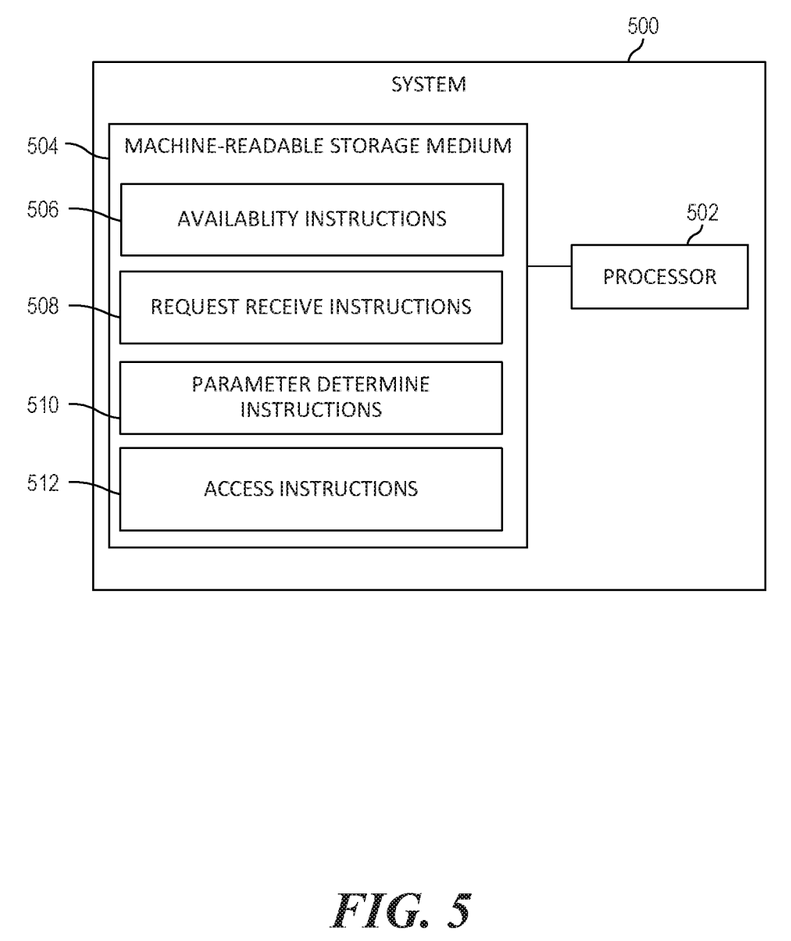
FIG. 5 is a block diagram depicting an example machine-readable storage medium comprising instructions executable by a processor for parameter based data access on a security information sharing platform.

FIG. 5 is a block diagram of an example system 500 for parameter based data access on a security information sharing platform. System 500 may be similar to system 110 of FIG. 1A and/or system 150 FIG. 1B, for example. In the example illustrated in FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510 and 512 to perform device connection and backup. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, access determine instructions 506, when executed by a processor (e.g., 502), may cause system 500 to making a first set of encrypted information available to a first member of a community. The security information sharing platform may enable sharing of security information among a plurality of members. The first set of encrypted information may be shared by a second member of the community and may be accessible by members of the community having a first parameter. The first parameter, governing access to the first set of information, may be stored, for example, on data storage (such as the data storage 129 described above in reference to FIG. 1A). The first parameter may be a group or characteristic of a group within the community of the security information sharing platform that the first member belongs to. Request receive instructions 508, when executed by a processor (e.g., 502), may cause system 500 to receive a request, from the first member, to access the first set of encrypted information, the request including a data password incorporating a second parameter. The second parameter is the parameter that is associated with the first member. The data password may be constructed using a message authentication code and the second parameter. Parameter determine instructions 508, when executed by a processor (e.g., 502), may cause system 500 to determine that the first parameter (governing access to the first set of information) matches the second parameter (associated with the first member). Determining that the first parameter matches the second parameter may include recomputing the second parameter from the data password and comparing the first parameter to the second parameter. A match indicates that the first member does indeed have access to the first set of information. Access instructions 508, when executed by a processor (e.g., 502), may cause system 500 to provide access to the first set of encrypted information to the first member upon a determination that the first parameter matches the second parameter.

The foregoing disclosure describes a number of examples for parameter based data access on a security information sharing platform. The disclosed examples may include systems, devices, computer-readable storage media, and methods for parameter based data access on a security information sharing platform. For purposes of explanation, certain examples are described with reference to the components illustrated in FIGS. 1A-5. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1A-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A system for parameter based data access on a security information sharing platform that enables sharing of security information among a plurality of members, the system comprising:
   a processor; and
   a non-transitory storage medium storing instructions executable on the processor to:
   make a first set of encrypted information available to a first member of a community of the security information sharing platform, wherein the first set of encrypted information is shared by a second member of the community;
   receive a request, from the first member, to access the first set of encrypted information, the request including a masked parameter that defines a group of members, wherein the masked parameter comprises a data password formed using a first parameter and a message authentication code of a member name and a member attribute;
   recompute the first parameter from the data password;
   determine that the first parameter matches an access parameter for accessing the first set of encrypted information; and
   provide the first member access to the first set of encrypted information in response to determining that the first parameter matches the access parameter.

2. The system of claim 1, wherein the instructions are executable on the processor to:
   determine that the first member is associated with the access parameter for accessing the first set of encrypted information.

3. The system of claim 1, wherein the instructions are executable on the processor to:
   access a parameter database to determine a set of parameters associated with the first member.

4. The system of claim 1, wherein the masked parameter defines the group of members within the community of the security information sharing platform that the first member belongs to.

5. The system of claim 1, wherein the masked parameter is used to define the community rather than enumerating individual members of the community.

6. The system of claim 5, wherein the masked parameter and another parameter that defines another group of members collectively define the community.

7. The system of claim 5, wherein the community is based on a plurality of groups of members including the group of members defined by the masked parameter.

8. The system of claim 1, wherein the member name is a name of the first member.

9. The system of claim 1, wherein the member attribute provides an indication of members of the community.

10. A system for parameter based data access on a security information sharing platform that enables sharing of security information among a plurality of members, the system comprising:
    a processor; and
    a non-transitory storage medium storing instructions executable on the processor to:
    make a first set of encrypted information available to a first member of a community of the security information sharing platform, wherein the first set of encrypted information is shared by a second member of the community;
    receive a request, from the first member, to access the first set of encrypted information, the request including a masked parameter that defines a group of members, wherein the masked parameter is a masked first parameter encrypted using a parameter masking key;
    decrypt the masked parameter using the parameter masking key to produce a decrypted first parameter;
    determine that the decrypted first parameter matches an access parameter for accessing the first set of encrypted information; and
    provide the first member access to the first set of encrypted information in response to determining that the decrypted first parameter matches the access parameter.

11. The system of claim 10, wherein the instructions are executable on the processor to provide the first member access to the first set of encrypted information by transmitting, to the first member, a data key component used to access the first set of encrypted information.

12. The system of claim 11, wherein the data key component is useable to decrypt the first set of encrypted information.

13. The system of claim 11, wherein the data key component is combined with a time-based data key component to form a data key that is useable to decrypt the first set of encrypted information.

14. A non-transitory machine-readable storage medium encoded with instructions for parameter based data access on a security information sharing platform that enables sharing of security information among a plurality of members, the instructions upon execution causing a system to:

make a first set of encrypted information available to a first member of a community of the security information sharing platform, wherein the first set of encrypted information is shared by a second member of the community and is accessible by members of the community using a first parameter;

receive a request, from the first member, to access the first set of encrypted information, the request including a data password formed using a second parameter and a message authentication code of a member name and a member attribute;

recompute the second parameter from the data password;

determine that the second parameter matches the first parameter; and provide access to the first set of encrypted information to the first member in response to a determination that the second parameter matches the first parameter.

15. The non-transitory machine-readable storage medium of claim 14, wherein the second parameter is used to define the community rather than enumerating individual members of the community.

16. The non-transitory machine-readable storage medium of claim 14, wherein the member name is a name of the first member.

17. The non-transitory machine-readable storage medium of claim 14, wherein the member attribute provides an indication of members of the community.

* * * * *